United States Patent
Thoma

[15] 3,686,606
[45] Aug. 22, 1972

[54] ELECTRICAL HUMIDITY SENSING ELEMENT

[72] Inventor: Paul E. Thoma, Burlington, Wis.

[73] Assignee: Johnson Service Company, Milwaukee, Wis.

[22] Filed: Aug. 24, 1970

[21] Appl. No.: 66,319

Related U.S. Application Data

[63] Continuation-in-part of Ser. No. 776,342, Nov. 18, 1968, abandoned.

[52] U.S. Cl. ............................... 338/35, 73/336.5
[51] Int. Cl. .................................... H01c 13/00
[58] Field of Search ............ 338/35, 34; 73/336.5

[56] References Cited

UNITED STATES PATENTS

| | | |
|---|---|---|
| 2,589,983 | 3/1952 | Blodgett ................. 338/35 X |
| 2,701,832 | 2/1955 | Marsden ................... 338/35 |
| 3,295,088 | 12/1966 | Smith ....................... 338/35 |
| 3,578,409 | 5/1971 | Silverman ................. 338/35 |

Primary Examiner—J. D. Miller
Assistant Examiner—R. Skudy
Attorney—Andrus, Sceales, Starke & Sawall

[57] ABSTRACT

A varying dimension electrical humidity sensing element for use in a humidity control and/or humidity indication system. The element includes a moisture sensitive material, which is capable of varying its dimension with changes in relative humidity, and a series of interconnected, electrically conductive particles of hydrophobic carbon are distributed within the moisture sensitive material. Dimensional changes in the moisture sensitive material caused by variations in moisture conditions act to vary the electrical resistance of the element and provide an indication of the relative humidity.

21 Claims, 7 Drawing Figures

Patented Aug. 22, 1972

3,686,606

INVENTOR.
Paul E. Thoma

BY

Andrus, Sceales, Starke & Sawall
Attorneys

ELECTRICAL HUMIDITY SENSING ELEMENT

This application is a continuation-in-part of application Ser. No. 776,342, now abandoned, filed Nov. 18, 1968, and entitled Electrical Humidity Sensing Element.

This invention relates to an electrical varying dimension humidity sensing element for use in a humidity control and/or humidity indication system.

In one form of electrical humidity sensing element, electrically conductive particles, such as carbon, are dispersed within a moisture sensitive material which is sensitive to changes in the moisture content of the atmosphere and responds in the form of dimensional changes to variations in humidity. As the moisture sensitive material changes its dimension in accordance with changes in moisture conditions, the resistance path through the conductive particles is altered to change the current flow through the element. The resistance of the element can indicate the relative humidity directly or the change of resistance can actuate a humidity control device.

U.S. Pat. No. 3,295,088 to Walter J. Smith is directed to an electrical humidity sensing element of this type. In this patent, the element comprises an elastic moisture insensitive core and an outer moisture sensitive layer is bonded to the core throughout its length. Electrically conductive particles are distributed within the core, and on an increase in moisture in the atmosphere, the moisture sensitive material expands and this expansion puts the core under stress which serves to elongate the chains of particles within the core to increase the electrical resistance of the element.

The present invention is directed to an improvement to the electrical humidity sensing element shown in the U.S. Pat. No. 3,295,088 of Smith. According to the invention, the electrically conductive particles are formed of hydrophobic carbon, in which state the particles are virtually insensitive to moisture conditions in that they will adsorb and/or absorb less than 4 percent by weight of water at 78° F when subjected to changes from 0 percent to 90 percent relative humidity. The carbon particles can be amorphous or graphitized. In a preferred form, the carbon is made hydrophobic by heat treatment and has a volatile content as chemisorbed oxygen in the form of carbon-oxygen complexes on the surface of the carbon of less than $6.0 \times 10^{-5}$ gram/square meter of carbon surface area. The hydrophobic carbon can also be of the type in which amorphous carbon is made hydrophobic by chemical treatment or reaction such as alkylation or arylation with the aid of Friedel-Craft catalysts, or graphitized carbon can be made hydrophobic by oxidizing graphite to graphitic acid which is in turn reacted with alkyl onium compounds to form alkyl onium salts. The carbon particles can have a fused agglomerated structure, such as fused, generally spherical masses, or fused elongated clusters in which the average largest dimension of the agglomerate cluster is at least three times greater than the average smallest dimension.

In one form of the invention, the carbon particles are distributed within a core and outer layers are bonded to the core. The outer layers can be formed of a material having a greater sensitivity to moisture than the material of the core, or the same sensitivity to moisture as the material of the core, or a lesser sensitivity to moisture than the material of the core. In some cases the outer surface of the outer layers can be hydrolyzed to increase the moisture sensitivity of the outer layer.

In a second form of the invention, the element is composed of a single moisture sensitive layer and the carbon particles are distributed within the layer. In this embodiment the outer surface of the moisture sensitive layer can be hydrolyzed to increase its sensitivity to moisture.

As the electrically conductive materials are hydrophobic, drifting of the element is minimized, which means that the element will have a relatively constant resistance at a fixed relative humidity over an extended period of time. In the past when using electrically conductive particles which adsorb and/or adsorb moisture, drifting can occur due to the fact that the particles slowly adsorb moisture, thereby increasing the resistance of the element. With hydrophilic particles, the rate at which the particles adsorb moisture is considerably slower than the rate at which the moisture sensitive material absorbs moisture with the result that considerable drifting occurs over extended periods of time until the moisture content of the particles reaches an equilibrium value. Drifting causes resistance changes at fixed relative humidities, thereby resulting in erroneous readings.

With the element in a preferred form of the invention the electrically conductive particles are formed of a hydrophobic type of carbon which is produced by heat treating the carbon to reduce the volatile content as chemisorbed oxygen in the form of carbon-oxygen complexes on the carbon surface to a minimum value, thereby substantially eliminating the reactive sites on the surface of the carbon particle to which the water molecules can be attached. Thus, the treated particles will not adsorb moisture to any appreciable extent, drifting is eliminated and more accurate readings of relative humidity are obtained.

The drawings illustrate the best mode presently contemplated of carrying out the invention.

Figure 1:
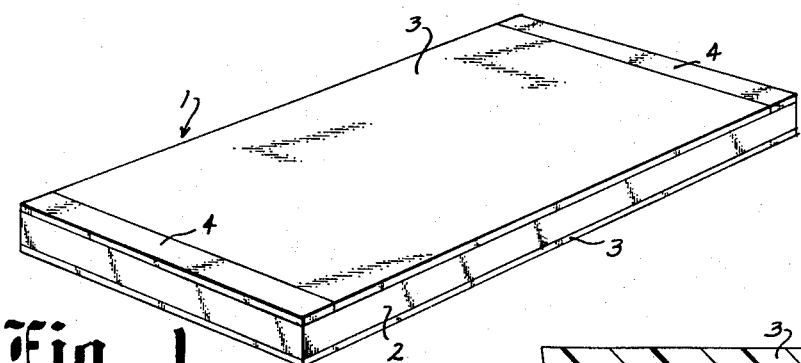
FIG. 1 is a perspective view of the humidity sensing element of the invention.
Figure 2:
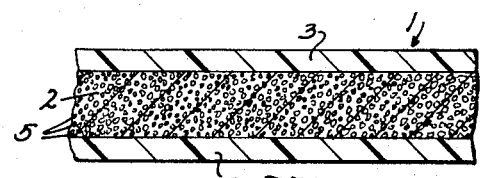
FIG. 2 is a section of the humidity sensing element shown in FIG. 1.

FIGS. 1 and 2 illustrate a preferred embodiment of an electrical humidity sensing element comprising an inner core 2 and outer layers 3 which are bonded integrally with the core. One of the outer layers 3 is shown to be coextensive in length with the core 2, while the ends of the other layer 3 terminate short of the ends of the core and a coating 4 of electrically conductive material such as silver paint, is applied to the exposed ends of the core.

A plurality of uniformly distributed particles of electrically conductive, hydrophobic carbon 5 are dispersed within the core. The particles are generally interconnected in the form of chains and provide a path for the flow of current through the core 2. For purposes of illustration, the size of the particles 5 is greatly exaggerated in the drawings.

The core 2 and outer layers 3 can be formed of materials which are sensitive to moisture and will show a dimensional increase of at least 0.5 percent and preferably from 1.5 to 7.0 percent, with a change from 0 to 100 percent relative humidity.

In most cases the outer layers 3 will be formed of materials which are more moisture sensitive than the material of core 2, but in some instances the material of outer layers 3 may be less moisture sensitive than the core material or may have the same moisture sensitivity as the core material. More specifically, the core and/or outer layers 3 can be composed of materials such as cellulose esters in which the esterifying acids contain up to eight carbon atoms, such as cellulose acetate, cellulose acetate-butyrate, cellulose acetate-propionate, cellulose acetate-valerate, and cellulose succinate; cellulose hydroxyethyl cellulose; carboxymethyl cellulose; gelatin; polyvinyl alcohol; polyacrylamide; polyacrylic acid; keratin; collagen; starch and starch derivatives; regenerated protein such as casein and zein; and synthetic polymers such as polyvinyl pyrrolidone and nylon.

In addition, the core 2 and/or outer layers 3 can be formed of crosslinked materials such as those disclosed in U.S. Pat. No. 3,461,723, of the same inventor. More specifically, the crosslinked material is formed by the reaction of a compound containing glucoside chains, such as a cellulosic material, and a stabilizing monomer or partial polymer capable of reacting with the hydroxyl groups of the glucosides. The glucoside-containing compound can be cellulose, or a cellulose ester in which the esterifying acids contain up to 20 carbon atoms and preferably up to six carbon atoms. Specific examples are cellulose nitrate, cellulose triacetate, cellulose butyrate, cellulose propionate, cellulose succinate, cellulose phthalate, or the like, Mixed cellulose esters such as cellulose acetate-butyrate, cellulose acetate-propionate, cellulose ethers in which the etherifying alcohol contains up to eight carbon atoms, such as ethyl cellulose, methyl cellulose, hydroxypropylmethylcellulose, and hydroxybutylmethylcellulose can also be employed. The stabilizing monomer or partial polymer can take the form of urea-formaldehyde, phenolformaldehyde, melamine-formaldehyde, triazine-formaldehyde, hexamethoxymethylmelamine, glyoxal, 2-hydroxyadipaldehyde and the like.

The carbon particles 5 can be either amorphous or crystalline in structure and are hydrophobic, meaning that they will adsorb and/or absorb less than 4 percent by weight of water at 78° F with relative humidity changes from 0 to 90 percent, and preferably will adsorb less than 1 percent water under these conditions. In the preferred form of the invention, the hydrophobic characteristics are achieved by treating the carbon particles to reduce the volatile content (the amount of chemisorbed oxygen in the form of carbon-oxygen complexes on the surface of the carbon) to a value less than $6.0 \times 10^{-5}$ gm/sq. meter of surface area. The chemisorbed oxygen on the carbon surface is produced during the process of forming the carbon particles, and if the chemisorbed oxygen is not removed, it will serve as reactive or nucleating sites for the attachment of water molecules to the carbon particles. The resulting hydrophilic characteristics of the untreated carbon particles having chemisorbed oxygen can cause drifting due to the fact that the particles adsorb moisture, thereby increasing the resistance of the element. More specifically, the hydrophilic particles adsorb moisture at a considerably slower rate than the rate at which the moisture sensitive material of the element absorbs moisture with the result that considerable drifting occurs over extended periods of time until the moisture content of the particles reaches an equilibrium with the moisture content of the moisture sensitive material.

Figure 7:
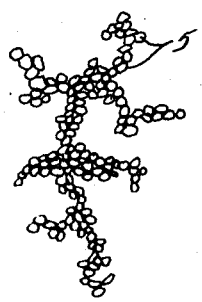
FIG. 7 is a drawing of a microphotograph of the carbon particles showing the elongated agglomerated clusters of particles.

The carbon particles as produced by a conventional fluid atomization process have an amorphous structure and in a preferred form of the invention exist in the form of agglomerated particles in which the individual particles are fused together either in the form of chain-like agglomerates or clusters, as illustrated in FIG. 7, or alternately, in the form of generally spherical clusters or masses. The chain-like agglomerated structure can be three-dimensional, in which the chains of fused particles extend in three directions, or two-dimensional in which the chains are predominantly in two directions. The particle size of the individual carbon particles is generally in the range of 1 to 100 millimicrons, while the chain-like agglomerates or clusters of particles have an average largest dimension of at least three times, and normally five to 30 times, greater than the smallest dimension of the agglomerated structure. As atomized, the agglomerated carbon particles, have a volatile content, in the form of chemisorbed oxygen, generally greater than $10 \times 10^{-5}$ grams per square meter of surface area.

The chemisorbed oxygen is removed from the surface of the carbon particles by heat treatment in which the particles are heated to a temperature above 1,800° F in the absence of oxygen and maintained at this temperature for a period longer than one-half hour, and usually in the range of 2 to 6 hours. The heating can be carried out in a vacuum or in a non-oxidizing atmosphere, as for example by using inert gas or reducing gas atmosphere. Heating to temperatures below 1,800° F will not effectively drive off all of the chemisorbed oxygen. Heating at temperatures above 6,000° F will drive off the chemisorbed oxygen, but will also change the structural characteristics of the carbon from an amorphous structure to a crystalline or graphitized structure at these elevated temperatures. When heating to above 6,000° F, the crystalline dimensions increase and the average interlayer separation decreases. In most cases the carbon particles retain their turbostratic nature, i.e., the layer planes remain randomly oriented above the layer normal. Thus the crystal structure of graphitized carbon is not identical to the graphite crystal structure where layer planes are specifically oriented about the layer normal with respect to each other.

During the graphitizing procedure, not only is the metallographic structure of the carbon particle changed, but the size of the agglomerates or clusters of the carbon particles is reduced.

As previously noted, the individual carbon particles have a size less than 1 micron and generally in the range of 1 to 100 millimicrons. If the particle size is above 1 micron nonlinear resistance values are obtained making the response of the element unpredictable. There is no lower limit to the size of the particles, but from practical aspects it is difficult to obtain particles having a size smaller than 20 millimicrons.

The amorphous carbon particles can also be made hydrophobic by chemical treatment or reaction such as alkylation or acrylation by use of Friedel-Craft catalysts, which serves to tie up the reactive sites on the carbon and thereby restrict the attachment of water molecules to the carbon. Graphitized carbon particles can also be made hydrophobic by oxidizing the graphitized carbon to graphitic acid which can then be reacted with alkyl onium compounds to form alkyl onium salts.

The carbon can be present in an amount up to 50% by weight of the core 2. If the concentration of the hydrophobic carbon particles is above 50 percent the core may tend to crack in service. There is no lower limit for the carbon content, but as the content of the carbon is reduced, the resistance of the element is increased. The thickness of the outer layers 3 should generally be less than 0.5 mil and generally be between 5 to 100 percent of the thickness of the core 2 with about 50 to 75 percent being preferred. However, this relationship can be carried depending on the moisture sensitivity of the outer layers and the core as well as the physical properties of the materials.

It is preferred that the core 2 and outer layers 3 be generally co-extensive in length and width. Electrical connections must be made to the core 2, and as illustrated in FIG. 1, the connections are made through the electrically conductive coatings 4.

While FIG. 1 illustrates the outer layers 3 being on both surfaces of the core 2, it is contemplated that the outer layer may be only on one surface of the core.

The core 2 and outer layers 3 are bonded together throughout their length and various methods may be employed to provide the bond. For example, the outer layers can be applied by coating the core with a solvent solution of the material of the outer layers and subsequently evaporating the solvent. As an alternate method, the outer layers can be bonded to the core by use of auxiliary adhesives.

On increase in moisture conditions in the atmosphere, the core 2 and outer layers 3 will absorb moisture causing these layers to expand in dimension. Depending on the relative moisture sensitivity between the core and the outer layers, one of the components may tend to expand to a greater extent than the other component. The expansion in the core results in a stretching or partial separation of the chains of the carbon particles 5, thereby causing an increase in the resistance to current flow through the element. On a decrease in moisture conditions, the outer layers and the core will shrink, with the result that the chains of the particles will be compressed or brought into closer contact to thereby decrease the resistance of the element.

Figure 3:
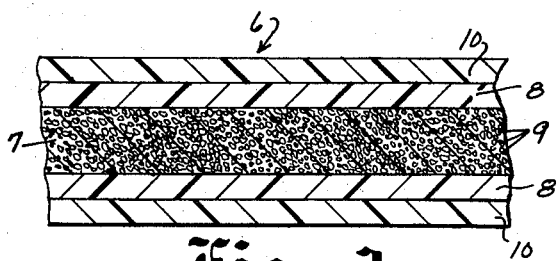
FIG. 3 is an enlarged sectional view of a modified form of the invention in which the outer layers of the element are hydrolyzed.

FIG. 3 shows a modified form of the invention in which the element 6 includes a central core 7 and outer layers 8 are bonded to the core 7. The core 7 and outer layers 8 can be formed of material similar to that described with respect to the core 2 and outer layers 3 of the first embodiment. The core 7 contains a plurality of uniformly distributed particles of hydrophobic carbon 9, similar to particles 5 of the first embodiment.

In the embodiment shown in FIG. 3, the outer surfaces of outer layers 8 are chemically treated to provide a hydrolyzed moisture sensitive outer surface 10. The hydrolyzation of the outer surface layer can be carried on by the method disclosed in U.S. Pat. No. 3,295,088. For example, a cellulose ester outer layer 8 can be subjected to the influence of either an alkaline or acid medium to hydrolyze substantially all of the acid radicals on the surface layer to thereby obtain a regenerated cellulose film which provides a very high moisture sensitivity.

Figure 4:
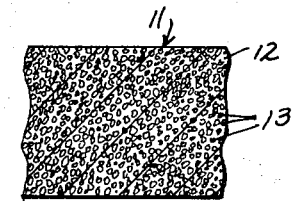
FIG. 4 shows a second modified form of the invention in which the element consists only of a single layer of moisture sensitive material.

FIG. 4 illustrates a second modified form of the invention in which the element 11 is composed of a single section or core 12 containing a plurality of hydrophobic carbon particles 13, similar in nature to the particles 5.

In the embodiment of FIG. 4, the core is formed of a material, such as those indicated in the first embodiment, which will show a dimensional increase of at least 0.5 percent and preferably 1.5 to 7 percent with changes from 0 to 100 percent relative humidity. On being subject to increased moisture conditions, the core 12 will expand in dimension, thereby tending to separate the chains of the electrically conductive particles 12 to increase the resistance to current flow. Conversely, on a decrease in moisture conditions, the core 12 will shrink thereby compressing the chains of particles 13 and decreasing the electrical resistance.

Figure 5:
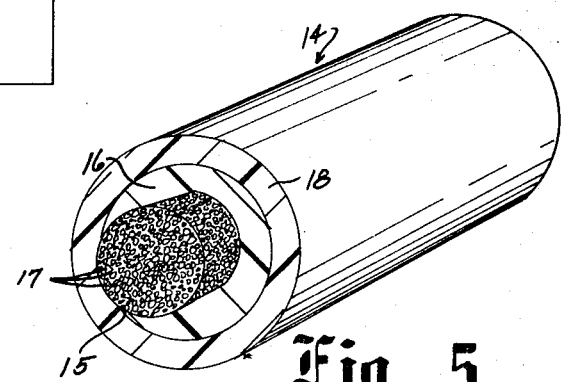
FIG. 5 is a perspective view of a third modified form of the invention in which the element is in cylindrical form.

FIG. 5 illustrates a further modified form of the invention in which the element is in a cylindrical form. In this embodiment, the element 14 comprises a core 15, similar to core 2 of the first embodiment, and an outer layer 16 is disposed around the core 15. The core 15 and outer layer 16 can be formed of materials similar to those described with respect to the core 2 and outer layers 3 of the first embodiment.

Dispersed within the core 15 are a plurality of hydrophobic carbon particles 17, similar to the particles 5 of the first embodiment.

The outer surface of layer 16 can be hydrolyzed to provide an outer surface film 18 having an increased moisture sensitivity.

The element shown in FIG. 5 operates in a manner similar to that described with respect to the prior embodiments.

Figure 6:
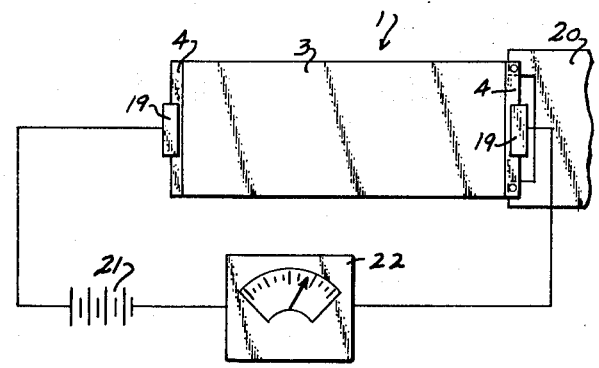
FIG. 6 is a schematic representation showing the element in an electrical humidity indicating system.

FIG. 6 is a schematic representation of the use of the element 1 in a humidity indicating system. As shown in FIG. 6, electrodes or clamps 19 are attached to the ends of the core 2 in contact with the electrically conductive coatings 4. One of the clamps is rigidly secured to a fixed insulating support 20. The electrodes are connected in an electrical circuit in series with a source of electrical power 21 and an electrical instrument 22 which provides means for measuring the electrical current in the circuit. The instrument 22 can be an ammeter as shown in FIG. 6, or an ohmmeter, potentiometer, or any other conventional device properly arranged for measuring either resistance of the element or the amount of current which passes in the circuit.

As previously described, an increase in moisture conditions causes the outer layers 3, as well as the core 2 to expand thereby rearranging the chains of particles 5 to change the resistance in the element and provide a reading on the instrument 22.

As the particles 5 are hydrophobic, they will not adsorb and/or absorb moisture to any extend during service. This insures that the element will not change resistance at a fixed relative humidity over an extended period of time and thereby insures more precise readings from the element. The agglomerated chain-type of carbon particles is particularly effective in providing increased stability for the element.

The following examples illustrate the method of preparing the electrical humidity sensing element:

EXAMPLE NO. I

On a clean glass plate a 6 mil thick wet film of the following solution was cast:
  7.5 grams cellulose acetate butyrate
    (17 percent combined butyryl)
  3.4 grams graphitized carbon
  89.1 grams methyl ethyl ketone The cast film was dried and baked at 56° C in an oven for 15 minutes. The desired outline for the element was then cut out with a razor blade and run under cool tap water while the film was still warm. The film readily separated from the glass plate. The resulting humidity sensing element was the single layer of moisture sensitive material containing the hydrophobic electrically conductive particles.

EXAMPLE II

The following solution was cast on a clean glass plate in the form of a 6 mil thick wet film:
  10.0 grams cellulose acetate butyrate
    (17 percent combined butyryl)
  90.0 grams methyl ethyl ketone The cast film was then air dried and a second wet film, approximately 9 mils thick and having the following composition was cast over the first film:
  7.5 grams cellulose acetate butyrate
    (17 percent combined butyryl)
  3.2 grams graphitized carbon
  89.3 grams methyl ethyl ketone After air drying of the second film, a third wet film approximately 6 mil thick was cast on the dry second film. The third film had the same composition as the first film.

The three layer assembly was then baked at 56° C in an oven for 15 minutes and the desired outline for the element was cut with a razor blade and run under cool tap water while the film assembly was still warm. The film assembly separated readily from the glass plate.

The resulting element contained outer layers and a core formed of the same uncrosslinked material with the graphitized carbon particles being dispersed within the core.

EXAMPLE III

The element of Example II was heated in an aqueous solution containing 40 percent sodium hydroxide at 230° F for 1 minute to hydrolyze the outer surface of the cellulose acetate-butyrate film. After removal from the sodium hydroxide solution the element was washed for 5 minutes in tap water and soaked overnight in distilled water. The resulting hydrolyzed surface was regenerated cellulose approximately 0.05 mil thick.

EXAMPLE IV

An element was prepared using the procedure of Example II and the following solutions were used in forming the core and outer layers:
  Solution for the core:
    7.5 grams cellulose acetate butyrate
      (17 percent combined butyryl)
    3.4 grams of graphitized carbon black
    89.1 grams methyl ethyl ketone
  Solution for outer layers:
    10.0 grams cellulose acetate butyrate
      (26 percent combined butyryl)
    90.0 grams ethyl acetate The resulting element had an uncrosslinked core with the electrically conductive hydrophobic particles dispersed within the core and had outer layers of uncrosslinked material having a different humidity sensitivity than the core.

EXAMPLE V

An element was prepared following the procedure of Example II. In this preparation, the following solutions were used in forming the core and the outer layers:
  Solution for the core:
    6.20 grams cellulose acetate butyrate
      (17 percent combined butyryl)
    3.80 grams graphitized carbon
    6.20 grams urea-formaldehyde monomer
    2.20 grams n-butyl alcohol
    2.05 grams ethyl alcohol
    0.15 grams p-toluenesulfonic acid
    1.60 grams triethylamine
    49.00 grams ethyl acetate
    28.80 grams diacetone alcohol
  Formulation for the outer layers:
    10.0 grams cellulose acetate-butyrate
      (17 percent combined butyryl)
    90.0 grams ethyl acetate After the three layers were cast on the glass plate and dried, the composite film was heated to a temperature of 350° F for 15 minutes, causing crosslinking of the core. The elements were then cut and removed from the plate.

The resulting element had a crosslinked core containing the electrically conductive particles and non-crosslinked outer layers having a moisture sensitivity less than that of the core.

EXAMPLE VI

The element of Example V was subjected to a hydrolyzing treatment in which the element was heated in an aqueous solution containing 40 percent sodium hydroxide at 230° F for 1 minute to hydrolyze the outer surface of the outer layer to regenerated cellulose. The resulting hydrolyzed surface layer was 0.05 mil thick.

EXAMPLE VII

Agglomerated particles of amorphous carbon having a chainllike structure produced by an oil atomization process and having an average particle diameter of 29 mu and a volatile content of $10 \times 10^{-5}$ grams per square meter of carbon surface were placed in a graphite container in a vacuum furnace. A vacuum was drawn on the furnace for 16 hours (the maximum vacuum chamber pressure was $5 \times 10^{-5}$ torr.). The particles were heated under vacuum to a temperature of 2,200° F for a period of 4 hours and then vacuum-cooled to room temperature. The volatile content of the treated carbon particles was less than $6.0 \times 10^{-5}$ grams per square meter.

An element was prepared using the procedure and components, as set forth in Example No. IV, except that the amorphous chain-like agglomerated, deoxidized, carbon particles, as prepared above, were substituted for the graphitized carbon particles. The resulting element had improved long term stability.

EXAMPLE VIII

Agglomerated hydrophobic carbon particles prepared in accordance with Example VII were employed instead of the graphitized carbon in preparing an element according to the procedure of Example I. The resulting element consisted of a single layer of moisture sensitive material containing the hydrophobic carbon particles and had improved long-term stability.

Various modes of carrying out the invention are contemplated as being within the scope of the following claims particularly pointing out and distinctly claiming the subject matter which is regarded as the invention.

I claim:

1. In an electrical variable dimension humidity sensing element, a material sensitive to changes in the moisture content of the atmosphere and capable of varying its dimension in response to said variations in moisture content, and a plurality of interconnected electrically conductive hydrophobic particles of carbon dispersed within a substantial portion of said material and disposed in sufficient contact to effect a measurement of variable resistance.

2. The element of claim 1, wherein said carbon particles adsorb and/or absorb less than 4 percent by weight of water at 78° F when subjected to changes from 0 percent to 90 percent relative humidity.

3. The element of claim 1, wherein said carbon particles have a volatile content as chemisorbed surface oxygen of less than $6.0 \times 10^{-5}$ gram per square meter of carbon surface area.

4. The element of claim 1, wherein said carbon particles are fused agglomerated clusters.

5. The element of claim 4, wherein the agglomerated clusters have a chain-like structure.

6. The element of claim 5, wherein the chain-like agglomerated clusters have an average largest dimension at least three times greater than the average smallest dimension of the chain-like agglomerated structure.

7. The element of claim 1, wherein the individual carbon particles have an average size in the range of 1 $m\mu$ to 100 $m\mu$.

8. The element of claim 1, wherein the carbon particles have an amorphous structure.

9. The element of claim 1, wherein the carbon particles have a graphitized structure.

10. The element of claim 1, wherein said material will show a dimensional increase greater than 0.5 percent with a change of 0 to 100 percent relative humidity.

11. The element of claim 1, wherein said particles comprise up to 50 percent by weight of said material.

12. The element of claim 1, and including a hydrolyzed surface layer disposed on the outer surface of said material.

13. An electrical variable dimension humidity sensing element, comprising a core formed of a material sensitive to moisture and characterized by the ability to respond in the form of dimensional changes to changes in relative humidity, and a plurality of interconnected electrically conductive hydrophobic particles of carbon embedded and dispersed within a substantial portion of said core and disposed in sufficient contact to effect a measurement of variable resistance, and an outer layer bonded to a substantial surface portion of the core and characterized by the ability to respond in the form of dimensional changes to changes in relative humidity.

14. The element of claim 13, wherein said carbon particles adsorb and/or absorb less than 4 percent by weight of water at 78° F when subjected to changes from 0 to 90 percent relative humidity.

15. The element of claim 13, wherein said carbon particles have a volatile content as chemisorbed surface oxygen of less than $6.0 \times 10^{-5}$ gram per square meter of carbon surface area.

16. The element of claim 13, wherein said carbon particles are fused agglomerated clusters.

17. The element of claim 13, wherein the outer layer has a greater moisture sensitivity than the core.

18. The element of claim 13, wherein the outer layer will show a dimensional increase of at least 0.50 percent with a change from 0 to 100 percent relative humidity.

19. The element of claim 13, and including a hydrolyzed surface layer bonded to the outer surface of said outer layer.

20. The element of claim 13, wherein said core has a moisture sensitivity equal to or greater than that of the outer layer.

21. An electrical apparatus, comprising an electrical circuit, a humidity sensing element including a material sensitive to changes in the moisture content of the atmosphere and capable of varying its dimension in response to said variations in moisture content, a plurality of interconnected electrically conductive hydrophobic particles of carbon dispersed within a substantial portion of said material and disposed in a sufficient contact to effect a measurement of variable resistance, and means for connecting spaced portions of said material in said electrical circuit, whereby variations in moisture conditions cause a rearrangement of the hydrophobic carbon particles to vary the current flow through the circuit.

* * * * *